United States Patent [19]
Nishiyama

[11] 4,257,684
[45] Mar. 24, 1981

[54] ELECTROCHROMIC SEGMENTS FORMED ON A DISPLAY ELECTRODE IN AN ELECTROCHROMIC DISPLAY CELL

[75] Inventor: Mitsuru Nishiyama, Nara, Japan

[73] Assignee: Sharp Kabushiki Kaisha, Osaka, Japan

[21] Appl. No.: 11,916

[22] Filed: Feb. 13, 1979

[30] Foreign Application Priority Data

Feb. 16, 1978 [JP] Japan ............ 53-19167[U]

[51] Int. Cl.³ .................................. G02F 1/17
[52] U.S. Cl. ........................................ 350/357
[58] Field of Search ............................. 350/357

[56] References Cited
U.S. PATENT DOCUMENTS 4,076,386  2/1978  Giglia ............................ 350/357
4,139,275  2/1979  Yano et al. ..................... 350/357

Primary Examiner—James W. Davie
Attorney, Agent, or Firm—Birch, Stewart, Kolasch & Birch

[57] ABSTRACT

An electrochromic display cell comprising a display electrode formed on a glass substrate, a counter electrode formed on another glass substrate, and a liquid electrolyte disposed between the two glass substrates. The display electrode comprises a transparent conductive, continuous film formed on the glass substrate, and a plurality of electrochromic ($WO_3$) segments formed on the continuous film. The electrochromic segments are spaced apart from each other with a thin gap having a width of 100 μm— 200 μm being formed therebetween. Each electrochromic segment has a size smaller than 0.1 cm².

7 Claims, 9 Drawing Figures

 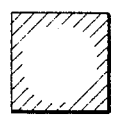 
FIG. 1(A)     FIG. 1(B)     FIG. 1(C)
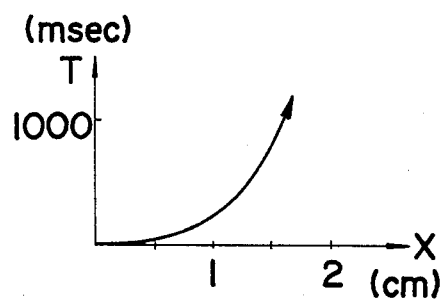
FIG. 2
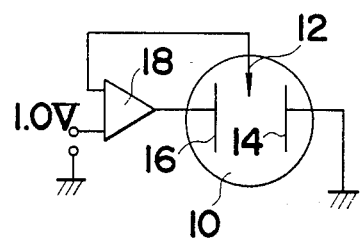
FIG. 3

ELECTROCHROMIC SEGMENTS FORMED ON A DISPLAY ELECTRODE IN AN ELECTROCHROMIC DISPLAY CELL

BACKGROUND AND SUMMARY OF THE INVENTION

The present invention relates to an electrochromic display device and, more particularly, to a display electrode structure in an electrochromic display cell.

When an electrochromic display electrode in an electrochromic display device has a large size, the display electrode is gradually colored from the edge portion thereof upon application of a coloration signal. This is considered to be caused by variations of electric field density distribution. Therefore, the conventional electrochromic display device was not suited for displaying a large pattern. Moreover, the conventional electrochromic display device required a considerably long period coloration signal in order to obtain uniform coloration in a large size segment.

The present inventor has discovered, through experimentation, that the above-mentioned gradual coloration is visually observed when the electrochromic display layer has a size larger than 0.1 cm$^2$.

Accordingly, an object of the present invention is to provide an electrochromic display cell which has a novel electrochromic display electrode suited for displaying a large pattern.

Another object of the present invention is to obtain uniform coloration of an electrochromic display segment in a short period of time.

Still another object of the present invention is to enhance the visibility of a displayed pattern in an electrochromic display device including a WO$_3$ film formed on a display electrode.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electrochromic layer comprising a plurality of electrochromic segments (WO$_3$ layers) are formed on a transparent display electrode which receives a coloration signal and a bleach signal for displaying a desired pattern. That is, the electrochromic layer formed on the transparent display electorde is divided into a plurality of segments so that one electrochromic segment has a size smaller than 0.1 cm$^2$. A thin gap formed between adjacent electrochromic segments has preferably a width of about 100 μm through 200 μm.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 1(A), 1(B) and 1(C) are schematic views showing transitional coloration of an electrochromic layer in an electrochromic display cell;

FIG. 2 is a graph showing a time period required for uniform coloration versus electrochromic layer width characteristics of an electrochromic layer in an electrochromic display cell;

FIG. 3 is a schematic block diagram of an embodiment of an electrochromic display device of the present invention;

DESCRIPTION OF THE PREFERRED EMBODIMENTS

Figure 4:
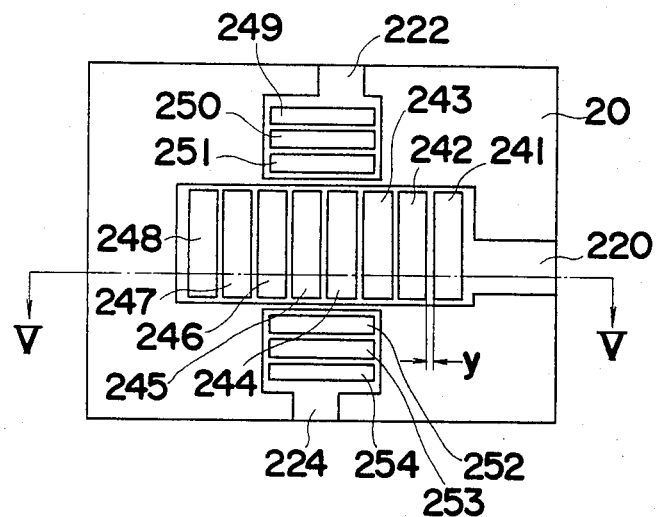
FIG. 4 is a plan view of an embodiment of a substrate carrying display electrode segments formed thereon of the present invention.

FIGS. 1(A), 1(B) and 1(C) show transitional coloration of an electrochromic layer in an electrochromic display cell, wherein the electrochromic layer has a 2 cm×2 cm size.

More specifically, FIG. 1(A) shows a bleached condition, FIG. 1(B) shows a transitional coloration condition at a time when one second has passed from initiation of application of a coloration signal, wherein only edge portions of the electrochromic layer are colored, and FIG. 1(C) shows uniformly colored condition at a time when several seconds have passed from the initiation of the application of the coloration signal.

FIG. 2 shows the relationship between the width X of the electrochromic layer which has a constant length of 0.5 cm (along the abscissa axis) and a time period T required for uniform coloration (along the ordinate axis).

It will be clear from FIG. 2 that the time period T required for uniform coloration increases as the width X increases. That is, the time period T increases as the size of the electrochromic layer increases. It is desirable that the time period T required for uniform coloration be limited below 100 msec. To achieve the above-mentioned response time, in the electrochromic display cell of FIG. 2, the width X should be selected below 0.5 cm. More preferably, the present inventor has discovered that the size of one electrochromic segment should be selected below 0.1 cm$^2$.

FIG. 3 schematically shows an embodiment of an electrochromic display system.

The electrochromic display system of the present invention mainly comprises an electrochromic display cell 10 which includes a reference electrode 12, a display electrode 14 and a counter electrode 16, and an operation amplifier 18 connected to the reference electrode 12 and the counter electrode 16.

In the coloration drive, the potential difference between the reference electrode 12 and the display electrode 14 is selected at 1.0 volt through the use of the operation amplifier 18, whereby charges of 6 millicoulombs/cm$^2$ flow through the display electrode 14 to color it. As is well known in the art, the electrochromic display cell 10 includes a WO$_3$ layer formed on the display electrode 14 and a liquid electrolyte (H$_2$SO$_4$) disposed in the electrochromic display cell 10.

A typical construction of the above-mentioned electrochromic display cell is described in copending application, "Electrochromic Display", Ser. No. 773,774, filed Mar. 2, 1977 by Kozo Yano, Yasuhiko Inami and Hisashi Uede and assigned to the same assignee as the present application. The application Ser. No. 773,774 issued on Feb. 13, 1979 as U.S. Pat. No. 4,139,275.

A constant-potential drive technique is described in, for example, copending application "Driver Circuit for Electrochromic Displays", Ser. No. 826,114, filed Aug. 19, 1977 by Hiroshi Take, Yasuhiko Inami, Hisashi Uede and Tomio Wada and assigned to the same assignee as the present application.

Figure 5:
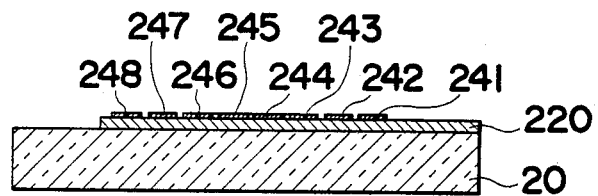
FIG. 5 is a sectional view of the substrate corresponding to section V—V of FIG. 4.

FIGS. 4 and 5 show an example of the display electrode pattern of the present invention, which is constructed to selectively display symbols "+" and "−".

Trnasparent electrodes 220, 222 and 224 are formed on a transparent glass substrate 20. The transparent electrodes 220, 222 and 224 are made of tin oxide or indium oxide formed through the vacuum deposition. The transparent electrode 220 is selected to receive the coloration signal when the symbol "−" is desired to be displayed, and the transparent electrodes 220, 222 and 224 are selected to receive the coloration signal when the symbol "+" is desired to be displayed.

Eight electrochromic segments 241 through 248 are formed on the transparent electrode 220, three electrochromic segments 249 through 251 are formed on the transparent electrode 222, and three electrochromic segments 252 through 254 are formed on the transparent electrode 224. These electrochromic segments 241 through 254 are made of tungsten oxide formed through the vacuum deposition.

More specifically, the electrochromic segments 241 through 248 are driven by a same signal, and are separated from each other by a thin gap with a width which is designated as y. The electrochromic segments 249 through 254 are driven by a same signal, and are separated from the adjacent electrochromic segment by a thin gap with a width which is also designated as y.

Figure 6:
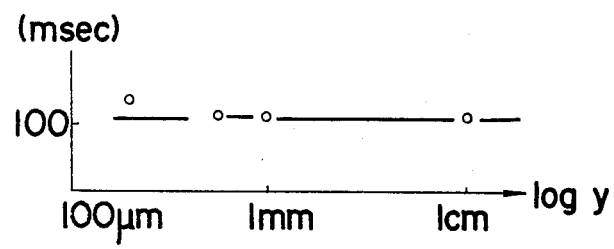
FIG. 6 is a graph showing a time period required for uniform coloration versus thin gap width y characteristics of an electrochromic layer included in the electrochromic display cell of FIGS. 4 and 5.

FIG. 6 shows a relationship between the thin gap width (log y) of the electrochromic segment of FIGS 4 and 5 (along the abscissa axis) and a time period required for uniform coloration of the electrochromic layer (along the ordinate axis).

The thin gap width y is varied between 100 $\mu$m and 1 cm. It will be clear from FIG. 6 that the time period required for uniform coloration is set around 100 msec without regard to the variation of the thin gap width as long as the size of the electrochromic segment is selected smaller than 0.1 cm$^2$. In order to obtain a visually continuous pattern, the thin gap width y is preferably selected between 100 $\mu$m and 200 $\mu$m.

Figure 7:
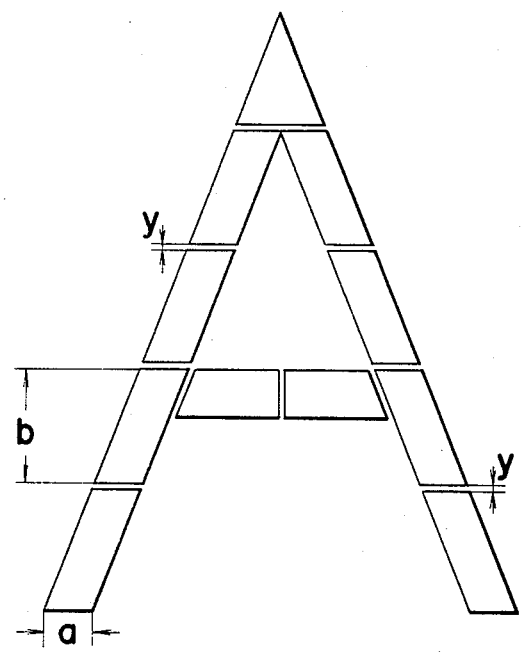
FIG. 7 is a plan view showing an example of a display pattern "A" performed by an embodiment of an electrochromic display cell of the present invention.

FIG. 7 shows an example of a pattern "A" displayed by an electrochromic display cell of the present invention.

Each electrochromic segment, which receives a same coloration selection signal, is spaced apart from the adjacent electrochromic segment by a thin gap with a width y which is selected between 100 $\mu$m and 200 $\mu$m. One discrete electrochromic layer segment has a width a of about 0.2 cm and a height b of about 0.5 cm.

As discussed above, in accordance with the present invention, a large uniform pattern can be displayed by an electrochromic display cell without slowing down the response period.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electrochromic display cell which includes at least one display electrode for displaying a desired pattern by selectively coloring or bleaching said display electrode, a counter electrode, and an electrolyte disposed between said display electrode and said counter electrode, said display electrode comprising:

a continuous electrode; and an electrochromic layer formed on said continuous electrode, said electrochromic layer including a plurality of segments, each of which being spaced apart from the adjacent segment with a thin gap formed therebetween.

2. The electrochromic display cell of claim 1, wherein said continuous electrode comprises a transparent continuous electrode.

3. The electrochromic display cell of claim 2, wherein said transparent continuous electrode comprises a tin oxide film.

4. The electrochromic display cell of claim 2, wherein said transparent continuous electrode comprises an indium oxide film.

5. The electrochromic display cell of claim 1, 2, 3 or 4, wherein said electrochromic layer comprises tungsten oxide films.

6. The electrochromic display cell of claim 5, wherein said thin gap has a width of 100 $\mu$m to 200 $\mu$m.

7. The electrochromic display cell of claim 4, wherein one discrete segment of the electrochromic layer has a size smaller than 0.1 cm$^2$.

* * * * *